Dec. 26, 1967     R. T. CASEBOLT     3,359,573

GLASS SHOWER ENCLOSURE DOOR

Filed Nov. 12, 1964

INVENTOR.
RALPH T. CASEBOLT
BY
Townsend and Townsend
ATTORNEYS

United States Patent Office 3,359,573
Patented Dec. 26, 1967

3,359,573
GLASS SHOWER ENCLOSURE DOOR
Ralph T. Casebolt, 500 High St., Oakland, Calif. 94601
Filed Nov. 12, 1964, Ser. No. 410,653
5 Claims. (Cl. 4—149)

This invention relates to glass doors and more particularly to glass doors of the sliding type used as an integral portion of a shower and bath tub enclosure or the like.

The design of shower doors, particularly those fabricated from glass or other transparent materials, require providing a door of enduring strength, pleasing appearance, and resistance to the effect of hot and cold water impinging on its surfaces.

The strength requirement of glass shower doors includes the ability to resist breaking or shattering under the ordinary impact of a normal adult slipping and falling against such enclosures. Many local building and state safety codes now require that glass shower doors meet certain minimum strength standards to assure such ability to withstand impact and avoid the likelihood of dangerous if not fatal accidents. Using conventional glass materials to meet such strength standards ordinarily requires either the use of safety glass or annealed glass containing a reinforcing mesh of wire screen or a metal frame around the glass door, and sometimes both, depending upon the thickness of the glass used. Many consumers object to the unaesthetic effect of wire embedded glass commonly used for reinforcing mesh. The use of a metal frame around the glass door panel to provide reinforcing does relatively little to strengthen the center portion of the panel and increases not only the cost and weight of materials at initial fabrication but also for shipping and at installation. To reduce the required amount of framing for such panels, a thicker panel of glass is commonly employed; but this is limited from a practical standpoint of weight, cost of the glass, and by the amount of temperature gradient that can be tolerated between the inside surface of the glass and the outside. As hot water impinges on the inner surface of the door, the outer surface remains relatively cold depending upon the thickness of the glass and the outside ambient temperature. If the thickness is too great, the outer surface remains too cold; and internal stresses are created within the glass which may result in cracking or checking. Even if such overt damage is avoided, the glass is usually weakened so that even a relatively minor blow by one occupying the stall may cause dangerous breakage or shattering.

A metal frame is also normally required to give strength to the glass door for purposes of strength generally, and for mounting from an overhead track system. In such application the entire edge upon which the supporting roller elements are attached must be reinforced by the frame to prevent cleavage or breakage at the points of load concentration. The lower edges of the glass panel are generally retained in a guide gutter or channel, and ordinarily must also be reinforced for this purpose. Door handles and other attachments require that they be mounted on such framing to assume proper strength in operation.

Although certain types of transparent or semi-transparent plastic materials have been used to fabricate shower doors, their application here has not been wholly successful. Most plastics suitable for this purpose are characterized by a relatively soft surface which scratches and mars easily as compared to the harder surface of most types of glass; and generally the plastics with which I am familiar are more expensive than the comparable glass materials. Since most plastics have a relatively low degree of stiffness, a suitable metal framework is also often required for their use as a door panel so that this added cost of material and weight is encountered.

Thus it is an object of this invention to provide a shower door of the type designed for use with a shower or combination bath tub enclosure and having sufficient structural rigidity and thermal qualities so that the mounting means may be attached directly to the door which may be provided with a door handle and snubber attached directly to the glass. This is made feasible by providing specially heat treated glass panels of a type hitherto unknown in shower enclosures with which I am familiar.

A feature and an advantage of this invention is that shower doors of strength capable of enduring ordinary impact of usage are provided without cumbersome and heavy outside frames. Moreover the high level of strength of the doors is achieved without unattractive embedded wire mesh, the use of extremely heavy glass, or the substitution of certain transparent plastics which have a soft surface and are marred relatively easily.

Another object of my invention is to provide a resilient cup shaped finger grip which may be secured to one side of the glass panel opposite to a handle or similar grip positioned on the other side. The cup shaped grip is designed to provide a means for manually sliding the door back and forth and also to form a stop which prevents one door from sliding past relative to a second adjacent door. At the same time the finger grip or protrusion is adapted to act as a buffer to prevent the sliding door from slamming into the ends of the framed enclosure with undue force caused by manipulation of the shower occupant.

Another advantage of my frameless glass doors is that the added strength achieved without frames around the edges of the panel and the like results is not only a less costly door but one that can be shipped mose easily and less expensively and installed in the field with greater facility and economy than the heavier conventional doors with which I am familiar.

Another object of my invention is to provide suspension rollers having individual mounting brackets which fit symmetrically upon the upper edges of the glass panel. The roller elements themselves may be off-set to slip easily into a conventional overhead track made integral with the shower or combination bath tub framed enclosure.

A feature and an advantage of my invention is that by eliminating metal or other types of frames around the glass panels, alignment problems which are caused by such frames are eliminated. More specifically, the moveable frames of conventional glass panels with which I am familiar are often out of parallel with adjacent moveable frames and the enclosures in which they are mounted due to unavoidable variations during fabrication. Correction of such misalignment, particularly in the field, is difficult if not impossible. The frameless glass panels of my invention, by relying only on the suspension rollers themselves without additional framing, eliminate such difficulties in alignment.

A feature and advantage of my shower door with the symmetrically mounted roller bracket is that the door panels are reversible. This eliminates special attention in respect to right hand and left hand mounting details required by some conventional designs with which I am familiar. The symmetrical brackets with the off-set rollers also permit greater tolerance if the doors are hung-off center or misaligned.

Another object of this invention is to provide a sliding shower door and shower housing having an overhead track formed by the upper portion of the housing from which the frameless glass shower door may be suspended by adjustable roller means attached directly to the upper edge of the door.

A feature and advantage of my invention in the use of heat treated or case hardened glass in a shower door is that glass panels of ordinary thickness may be strengthened to have sufficient structural rigidity to form the sole support for the overhead suspension rollers. Such heat treated glass has been found also to have sufficient thermal resistance to withstand hot fluids, or alternate hot and cold fluids, on one side of the door with differing temperature fluids on the other side without breakage or undue structural weakening.

Other objects, features and advantages will become apparent from a reading of the detailed specification that follows wherein given reference symbols refer to the various elements shown in the figures of the accompanying drawing.

Turning now to the drawing

Figures 1, 2:
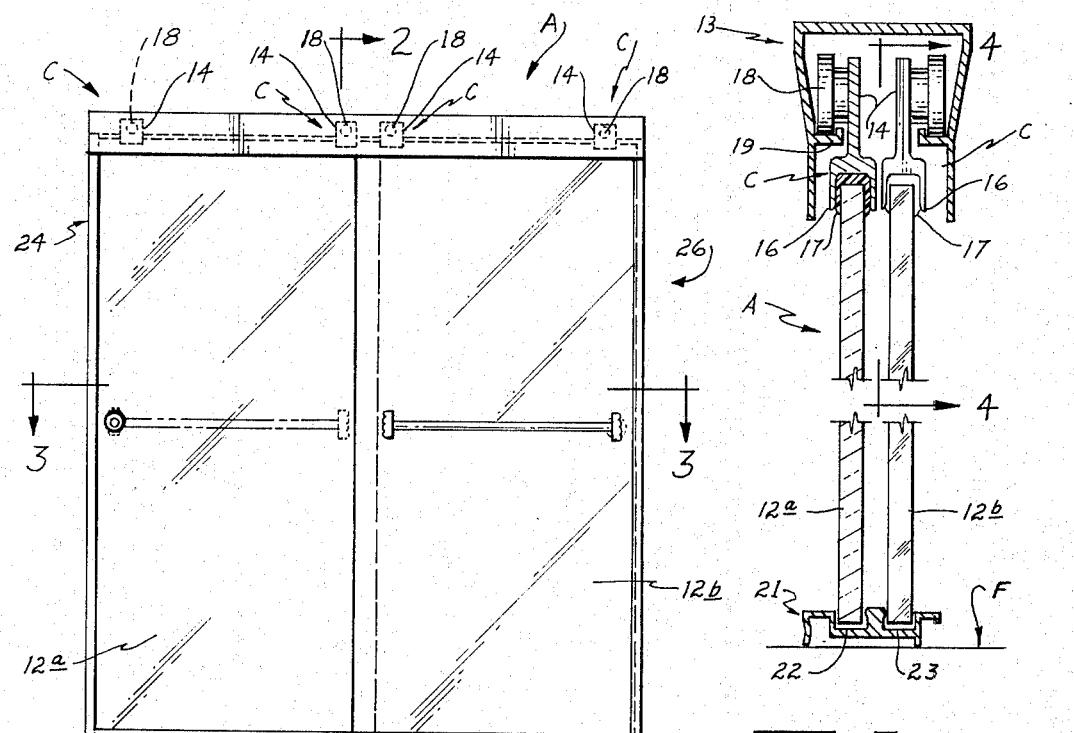
FIG. 1 shows a pair of glass sliding shower doors utilizing my invention.
FIG. 2 is a partial sectional side elevation taken along line 2—2 of FIG. 1.
Figures 3A, 3B:
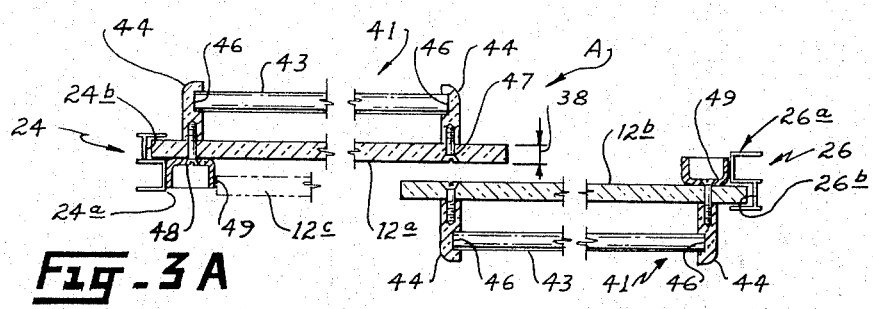
FIG. 3A is a partial plan section taken along line 3—3 of FIG. 1.
FIG. 3B is a fragmentary view of an alternative portion of FIG. 3A.

My invention comprises the new and useful application of specially treated glass panels indicated generally at A in FIGS. 1, 2A and 3A. By providing tempered glass panels, whose preparation I shall describe in somewhat greater detail hereinafter, I have found it possible, albeit surprising, to fabricate shower doors which can be suspended and manipulated by means attached directly to the glass while at the same time eliminating wire mesh or frame reinforcement. Moreover, I have found it satisfactory to use roller hangers such as those indicated generally by the letter C in FIGS. 1 and 2, and shown in somewhat greater detail in FIG. 4 and directly attached handles and snubbers as described in greater detail hereinafter.

The invention is best understood by first referring to FIGS. 1 and 2. Plate glass sheets 12a and 12b are suspended by means of the suspension rollers shown generally at C within the upper shower frame enclosure indicated generally at 13. The rollers comprise yoke section 14 which at its lower most dependent portion is shaped to form hanger 16 and is directly secured to the glass sheets by means of suitable adhesive filler 17. I use adhesives which are characterized by the ability to adhere to glass as well as the material from which hanger 14 is fabricated.

Figure 4:
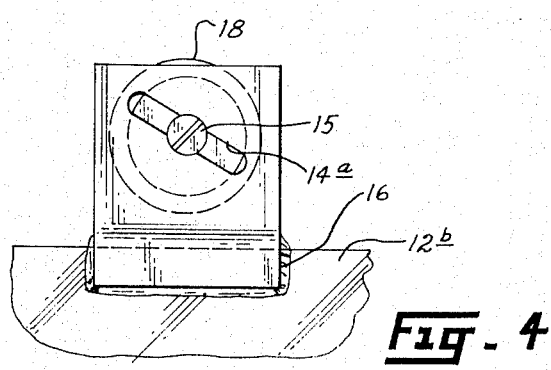
FIG. 4 is a partial view taken along line 4—4 in FIG. 2.

As seen in FIGS. 2 and 4, rotatable rollers 18 may be attached by means of mounting cap screw 15 which passes through diagonal slot 14a in hanger 14 and threadably engages the fixed bearing housing support of the rotatable roller. The diagonally slotted portion permits adjustment of the entire glass panel elevation in respect to the framed enclosure by merely loosening up screws 15, adjusting the height of the door, i.e. position in respect to roller 18, and tightening the cap screw. The rotatable rollers and hanger 14 ride slidably in channel portion 19 of the frame indicated generally at 13. This provides the entire sliding glass door panel with a slidable suspension from the overhead portion of the shower enclosure frame.

Directly beneath, and in vertical alignment with the upper portion of the shower enclosure frame indicated at 13, in FIGS. 1 and 2, is a lower gutter designated generally at 21. The lower gutter provides channel portion 22 which receives and restrains the lower edge of glass panel 12a and portion 23 acts as a similar restraint for the lower edge of panel 12b. The gutter indicated at 21 may be secured to the floor or bath tub ledge shown generally at F by fastening devices known in the art and not shown. Each end of the lower portion is normally connected to the upper frame member indicated generally at 13 by means of vertical members indicated at 24 and 26 in FIG. 1 and also shown in FIGS. 2 and 3A.

FIG. 3A shows a door handle assembly indicated generally at 41. Handle bar 43 is shaped to reside between brackets 44 which have handle receiving indentations 46. The brackets are secured directly to my heat treated plate glass surfaces 12a and 12b by means of conventional flat head counter sunk cap screws 47 and 48. It is to be noted that cap screw 48 is slightly longer than 47 to accommodate and secure to the side of the panel opposite to the handle bar a resilient cup shaped member 49. Protrusion 49 may be grasped by the occupant within the shower enclosure to move the sliding door from the closed to the open position; and also the outer perimeter of member 49 acts as a door stop to prevent outer panel 12a or 12b from passing the other and slamming against the opposite vertical frame member indicated at 24 or 26 with excessive force. When either door 12a or 12b, or both together as indicated by phantom line 12c, is thrust toward the end frame indicated at 24, snubber or finger grip 49 contacts extended portion 24a of the frame before the leading edge of the glass panel forcibly enters channel portion 24b. Protrusion 49 is fabricated of a resilient material and hence cushions the impact of the panel or panels. A similar arrangement is adapted for such action when the glass panels are directed toward the end frame indicated generally at 26 having extending portion 26a and channel portion 26b.

An alternate embodiment of the handle arrangement for my glass panel doors is shown in FIG. 3B. Straight handle portion 43 and brackets 44 are replaced with protruding cups 49 on both sides of the panel.

The roller suspension elements indicated at C and the aforementioned handle and snubber assemblies are secured directly to the movable glass panel doors without additional reinforcement frames or wire mesh embedded in the glass. The thickness of glass employed indicated by dimension 38 in FIG. 3A has been found satisfactory even though limited to not more than about a quarter of an inch. Actual use with these limitations has shown that my frameless doors are capable of resisting an ordinary impact caused by a normal adult falling against my door from one side of the shower enclosure. This ability has been found even when one side of the door is exposed to contact with hot water such as that used in a shower while the other side is at a relatively cooler temperature such as ambient. These surprising results are believed to be attributable to my novel application in sliding shower doors of heat treated glass.

In particular, I heat treat the glass of my invention by a process known in the art as tempering. First the glass sheets that are in a relatively soft, usually annealed condition, are cut to very nearly their actual finish size making allowance for change of dimensions during heat treatment. Then all holes that will finally be required in the glass, such as that for handles and finger grips described above, are drilled. I then elevate the temperature of the glass in a special furnace designed for the purpose, but not shown in the drawing, to a temperature of about 1500 degrees Fahrenheit. The glass is then chilled over substantially its entire surface with a blast of compressed air expelled under pressures ranging from about 75 to 100 pounds per square inch. The compressed air utilized is cooled after compression so that the temperature of the air impinging upon the heated glass is ambient. This chills the glass rapidly to form an extremely hard and strong surface over all of the glass panel. The hardening that results imparts to my glass panels a strength increase in the neighborhood of about five times over that of ordinary annealed glass. Because of this heat treatment my glass shower doors, even though of limited thickness and without the benefit of reinforcing mesh or metal frames, is rendered capable of supporting itself by mounting means attached directly to the doors and the enclosure frames, resisting the forces induced by the directly attached handles and snubbing effects of the protruding finger grips. In addition, the doors are capable of sliding in channels 22 and 23 shown in FIG. 2 without undue wear or danger to the occupant of the shower stall.

The increased structural strength of the doors has been found to enable them to withstand with reasonable safety the glancing blows such as are caused by ordinary adult occupants slipping or falling against either side of the shower enclosure. I have also found that the additional strength and hardness of the glass is accompanied by surprising thermal resistance wherein the panel resists cracking or undue structural weakening even when extreme temperature differences caused on opposite sides of the panel by hot or cold fluids impinging one side with normal ambient or relatively cool temperatures on the other. Since the strength of the heat treated door permits fabrication from panels of limited thickness, the temperature gradient is further reduced thus helping to maintain the entire glass at a fairly uniform temperature. This further reduces the likelihood of weakness due to extreme temperature differences on opposite side of the sliding door.

Because of the design simplicity of my shower doors, I have found that they are relatively easy to pack, ship, and install in the home. Because the glass used may be limited to as little as ¼ of an inch, the weight of my doors are kept to a minimum and by eliminating the necessity of metal frames and reinforcing mesh the weight is even further reduced.

Although I have described my invention in some detail in the foregoing specification this has been done for purposes of clarity of explanation and it is understood that a variety of modifications may be practiced within the scope of the appended claims.

I claim:
1. In a shower door construction: an open frame provided with a top member, a bottom member, and a pair of spaced side members interconnecting said top and bottom members, each of the members having an inner periphery at the corresponding boundary of the opening of said frame and panel-receiving groove means at the corresponding inner periphery; a pair of frameless panels of tempered glass, each panel having a width less than the distance between said side members and being provided with free top, bottom, and side edges; and means mounting each panel on said top member for vertical adjustment relative thereto and for movement in a plane substantially parallel to the plane of movement of the other panel with said top edge of the panel being disposed within the groove means of said top member and the bottom edge of the panel being disposed within the groove means of said bottom member, whereby each panel is coupled to the frame and can be moved from a first position closing a respective portion of the frame opening to a second position clearing the last mentioned portion, one side edge of each panel being disposed within the groove means of the adjacent side member and the side margin of the panel adjacent the opposite side edge thereof being in overlapping relationship to the corresponding margin of the other panel when the panels are in their first positions to effect substantially complete closing of said frame opening.

2. In a shower door construction as set forth in claim 1, wherein said mounting means includes a hanger secured to a corresponding panel, a roller, and means adjustably securing the roller to said hanger.

3. In a shower door construction as set forth in claim 1, wherein one of the panels has a stop disposed in the path of travel of the other panel and engageable with the side member adjacent said first position of the panel before said one side edge of the panel engages the inner extremity of the groove of the last mentioned side member as the panel is moved into its first position.

4. In a shower door construction of the type having an open frame provided with a top member, a bottom member and a pair of spaced side members interconnecting said top and bottom members, each of the members having an inner periphery at the corresponding boundary of the opening of the frame and panel-receiving groove means at the corresponding inner periphery, the improvement comprising: a pair of frameless panels of tempered glass, each panel having a width less than the distance between said side members and being provided with free top, bottom and side edges, the top edge of each panel having means for shiftably mounting same on said top member of the frame for movement in a plane substantially parallel to the plane of movement of the other panel with said top edge of the panel being receivable within the groove means of said top member and the bottom edge of the panel being receivable within the groove means of said bottom member, whereby each panel is coupled to said frame and can be moved from a first position closing a respective portion of said frame opening to a second position clearing the last mentioned portion when the panels are mounted on said top member, one side edge of each panel being received within the groove means of the adjacent side member and the opposite side edge of the panel being in proximity to the corresponding side edge of the other panel when the panels are in their first positions to effect substantially complete closing of said frame opening, and a resilient projection carried by and extending laterally from one face of each panel respectively, the projection on each panel being disposed in the path of travel of the other panel and adapted to engage the side member adjacent said first position of the panel before said one side edge of the panel engages the inner extremity of the groove of the last mentioned side member as the panel is moved into its first position.

5. In a shower door construction as set forth in claim 4, wherein one of the panels has a second projection secured to and extending laterally from the opposite face of the panel, the second projection being in substantial alignment with the first mentioned projection of the panel.

References Cited

UNITED STATES PATENTS

| | | | |
|---|---|---|---|
| 1,563,876 | 12/1925 | Smith | 16—86 |
| 2,197,385 | 4/1940 | Ricken | 4—149 |
| 2,294,792 | 9/1942 | Miller | 49—388 |
| 2,907,078 | 10/1959 | Hahn | 49—409 |
| 3,074,077 | 1/1963 | Taubman | 4—149 |
| 3,103,713 | 9/1963 | Ahlgren | 49—413 |
| 3,239,891 | 3/1966 | Gardner | 49—409 |

SAMUEL ROTHBERG, *Primary Examiner.*

B. E. KILE, *Assistant Examiner.*